United States Patent
Kusumoto et al.

(10) Patent No.: US 6,847,419 B2
(45) Date of Patent: Jan. 25, 2005

(54) POLARIZING PLATE AND LIQUID CRYSTAL DISPLAY USING THE SAME

(75) Inventors: Seiichi Kusumoto, Ibaraki (JP); Hisashi Mihara, Ibaraki (JP); Atsushi Kitagawa, Ibaraki (JP); Eiji Hamamoto, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 446 days.

(21) Appl. No.: 10/071,217

(22) Filed: Feb. 8, 2002

(65) Prior Publication Data

US 2003/0001989 A1 Jan. 2, 2003

(30) Foreign Application Priority Data

Mar. 5, 2001 (JP) ........................ 2001-060284

(51) Int. Cl.⁷ ..................... G02F 1/1335; G02F 1/1333
(52) U.S. Cl. ......................... 349/96; 349/122
(58) Field of Search .................... 349/96, 122, 138

(56) References Cited

U.S. PATENT DOCUMENTS

| | | | | |
|---|---|---|---|---|
| 4,025,688 A | * | 5/1977 | Nagy et al. | 428/350 |
| 5,354,513 A | * | 10/1994 | Nakamura et al. | 252/585 |
| 6,147,738 A | * | 11/2000 | Okamoto | 349/122 |
| 6,512,562 B1 | * | 1/2003 | Kobayashi et al. | 349/122 |

\* cited by examiner

Primary Examiner—Tarifur R. Chowdhury
(74) Attorney, Agent, or Firm—Westerman, Hattori, Daniels & Adrian LLP

(57) ABSTRACT

A polarizing plate and a liquid crystal display using the same are disclosed. The polarizing plate includes a polarizer made of a synthetic resin and protective films. The same protective films are attached to both sides of the polarizer. When a FTIR-ATR method is carried out with respect to the both sides of the protective film and a peak intensity (A) in the wavelength range around 1488 $cm^{-1}$ of one side, a peak intensity (B) in the wavelength range around 1365 $cm^{-1}$ of one side, a peak intensity (A') in the wavelength range around 1488 $cm^{-1}$ of another side and a peak intensity (B') in the wavelength range around 1365 $cm^{-1}$ of another side are measured, and (C) and (C') are represented by the relationships: (A)/(B)=(C) and (A')/(B')=(C'), (C)/(C')$\geq$1.2 is satisfied. The same sides of the protective films having the (C) and (C') are adhered to both sides of the polarizer. In the polarizing plates, in accordance with the invention, even at the exposure to heat and humidity, advantageously occurrence of curling (warping) is reproduced.

18 Claims, No Drawings

POLARIZING PLATE AND LIQUID CRYSTAL DISPLAY USING THE SAME

BACKGROUND OF THE INVENTION

1. Field of the Invention

The present invention relates to a polarizing plate used for a liquid crystal display (LCD) and a liquid crystal display using such a polarizing plate.

2. Description of the Prior Art

Recently, demand for LCDs used for, for example, personal computers has increased sharply. Application for LCDs has also broadened. Recently, such LCDs are used for monitoring as well.

A polarizing plate used for a LCD is manufactured, for example, by a method including steps of: dyeing a polyvinyl alcohol (PVA) film with dichroic iodine or a dichroic dyestuff; crosslinking the film with boric acid, borax, or the like; stretching the film uniaxially, followed by drying the film and sticking it to a protective layer such as a triacetylcellulose (TAC) film. The respective steps of dyeing, crosslinking and stretching are not necessarily carried out separately and can be carried out simultaneously. Furthermore, there is no limitation on the order of the steps.

However, there is a problem in that when a TAC film is simply attached to a PVA-based polarizer to produce a polarizing plate, curling occurs in the polarizing plate due to the difference in shrinkage between the film and the polarizer. Furthermore, there is also a problem in that when the polarizing plate is left under a heating and humid condition, the curling occurs more significantly.

SUMMARY OF THE INVENTION

In one aspect, the present invention relates to a polarizing plate in which the occurrence of curling (warping) is prevented even if a polarizer and a protective film are attached to each other. In another aspect, the present invention relates to a liquid crystal display using such a polarizing plate.

In some embodiments of the present invention, a polarizing plate includes a polarizer made of a synthetic resin and protective films. The protective films are attached to both sides of the polarizer, wherein when a FTIR-ATR (Fourier transform infrared radiation—attenuated total reflection) method is carried out with respect to both sides of the protective film and a peak intensity (A) in the wavelength range around 1488 cm$^{-1}$ of one side, a peak intensity (B) in the wavelength range around 1365 cm$^{-1}$ of one side, a peak intensity (A') in the wavelength range around 1488 cm$^{-1}$ of another side and a peak intensity (B') in the wavelength range around 1365 cm$^{-1}$ of another side are measured, and (C) and (C') are represented by the relationships: (A)/(B)=(C) and (A')/(B')=(C'), (C)/(C')≧1.2 is satisfied, and the same sides of the protective films having the (C) and (C') are adhered to both sides of the polarizer.

In some embodiments of the present invention, the synthetic resin film comprises a polyvinyl alcohol film and the protective film is a triacetylcellulose film.

In some embodiments, the polarizing plate of the present invention includes a pressure-sensitive adhesive layer.

In some embodiments, the polarizing plate of the present invention includes an anti-glare layer.

In some embodiments, the polarizing plate of the present invention includes a reflector or a transreflector is attached to the polarizing plate.

In some embodiments, the polarizing plate of the present invention includes a retardation plate or a λ plate is attached to the polarizing plate.

In some embodiments of the present invention, a viewing angle compensating film is attached to the polarizing plate.

In some embodiments of the present invention, a brightness enhanced film is attached to the polarizing plate.

In some embodiments of the invention, a liquid crystal display uses a polarizing plate in accordance with an embodiment as described above on at least one side of a liquid crystal cell.

DESCRIPTION OF THE PREFERRED EMBODIMENTS

A TAC film includes a plasticizer. It is found that curling (warping) occurs in a polarizing plate frequently when the amount of the plasticizer is different between one side and another side of the TAC film. The inventors have found that the curling (warping) of the polarizing plate is caused by the difference in shrinkage between one side and another side of the TAC film due to the difference in the amount of the plasticizer between one side and another side of the TAC film. In some embodiments of the present invention, TAC films are adhered to both sides of a PVA film so that the same sides (sides having the same amount of plasticizer) of the TAC film are brought into contact with the PVA film. The amount of the plasticizer on the sides of the TAC film may be measured by the FTIR-ATR method. Thereby, the shrinking power of the TAC film on both sides of the PVA film are offset, and thus the occurrence of curling (warping) in the polarizing plate may be reduced. In some embodiments of a polarizing plate of the present invention, it may be possible to reduce curling (warping) even under a heating and humid condition. When the polarizing plate is attached to a LCD panel, it may be possible to prevent foams from entering, thus improving the efficiency in manufacturing liquid crystal displays.

Specifically, the present invention provides a polarizing plate including a polarizer made of a synthetic resin and protective films. In the polarizing plate, the same protective films are adhered to both sides of the polarizer. When a FTIR-ATR method is carried out with respect to both sides of the protective film and a peak intensity (A) in the wavelength range around 1488 cm$^{-1}$ of one side, a peak intensity (B) in the wavelength range around 1365 cm$^{-1}$ of one side, a peak intensity (A') in the wavelength range around 1488 cm$^{-1}$ of another side and a peak intensity (B') in the wavelength range around 1365 cm$^{-1}$ of another side are measured, and (C) and (C') are represented by the relationships: (A)/(B)=(C) and (A')/(B')=(C'), (C)/(C')≧1.2 is satisfied. The same sides of the protective films having the (C) and (C') are adhered to both sides of the polarizer.

The range: (C)/(C')≧1.2 is defined from the following reason. That is, if the difference in the amount of plasticizer between one side and another side of the protective film is beyond the difference satisfying the relationship: (C)/(C') ≧1.2, no curling (warping) occurs from the beginning. However, in fact, since it is difficult to equalize the amount of the plasticizer on one side and the another side of the protective film, most of TAC films are within the range satisfying the relationship:(C)/(C')≧1.2.

In a basic configuration of a polarizing plate in accordance with the present invention, a transparent protective film as a protective layer may be adhered to one side or both sides of the polarizer made of a polyvinyl alcohol-based polarizing film containing dichroic substance, and the like, via an appropriate adhesive layer, for example, a layer of adhesive made of a vinyl alcohol-based polymer.

A polarizer (polarizing film) made of an appropriate vinyl alcohol-polymer film that is known in the art, such as polyvinyl alcohol film, a partially formalized polyvinyl alcohol film, or the like, is subjected to appropriate treatment such as dyeing with dichroic substances such as iodine and a dichroic dyestuff, stretching, and crosslinking into any suitable orders and manners. Any polarizer can be used, as long as it allows linearly polarized light to pass through the film when natural light enters. In some embodiments, a polarizer with an excellent light transmittance and a polarization degree may be preferred.

As a material for the protective film forming a transparent protective layer provided on one side or both sides of the polarizer (polarizing film), an appropriate transparent film can be used. As the polymer, for example, an acetate-based resin such as triacetylcellulose may be used. However, the polymer is not necessarily limited thereto.

When factors such as polarizing property and durability are taken into consideration, a preferred transparent protective film may be a triacetylcellulose film having a surface saponified with alkali or the like.

In some embodiments, the transparent protective film used for the protective layer may be subject to treatment for providing properties such as hard coating, anti-reflection, anti-sticking, dispersion, or anti-glaring. Hard coating treatment may be carried out to prevent scratches on the surfaces of the polarizing plate by, for example, applying a surface of the transparent protective film with a coating film of a hardening resin (e.g., a silicon-based ultraviolet hardening resin) having excellent hardness and smoothness, etc.

Anti-reflection treatment may be carried out to prevent reflection of outdoor daylight on the surface of the polarizing plate by, for example, forming an anti-reflection film in a conventional manner. Anti-sticking treatment may be carried out to prevent adjacent layers from sticking to each other. Anti-glaring treatment may be carried out to prevent visibility of light passing through the polarizing plate from being hindered by outdoor daylight reflected on the surface of the polarizing plate. The anti-glaring treatment can be carried out by providing microscopic asperities on a surface of a transparent protective film in an appropriate manner, for example, by roughening the surface by sand-blasting or embossing, by blending transparent particles, or the like.

An example of the above-mentioned transparent fine particles includes silica, alumina, titania, zirconia, stannic oxide, indium oxide, cadmium oxide, antimony oxide or the like, which have an average particle diameter ranging from 0.5 μm to 20 μm. Inorganic fine particles having electro-conductivity may also be used. Alternatively, organic fine particles including, for example, crosslinked or uncrosslinked polymer particles, etc. can be used. The amount of the transparent fine particles may range generally from 2 parts by weight to 70 parts by weight, and particularly from 5 parts by weight to 50 parts by weight for 100 parts by weight of the transparent resin.

An anti-glare layer including transparent fine particles can be provided as the transparent protective layer or a coating layer applied onto the surface of the transparent protective layer. The anti-glare layer may a function as a diffusion layer to diffuse light passing through the polarizing plate to enlarge the viewing angle (this function is referred to as a viewing angle compensating function). The above-mentioned layers such as the anti-reflection layer, the anti-sticking layer, the diffusion layer, and the anti-glare layer can be provided separately from the transparent protective layer as an optical layer, for example, in sheet form including the above-mentioned layers.

There is no specific limitation on treatment for adhering the polarizer (polarizing film) to the transparent protective film that is a protective layer. Adhesion can be carried out, for example, by using an adhesive such as an adhesive including a vinyl alcohol-based polymer, or an adhesive including at least a water-soluble crosslinking agent of vinyl alcohol-based polymer such as boric acid, borax, glutaraldehyde, melamine and oxalic acid. A layer of such an adhesive can be formed by, for example, applying and drying an aqueous solution. In preparation of the aqueous solution, other additives, or a catalyst such as an acid can be blended if necessary.

A polarizer can be used as an optical member that is laminated onto another optical layer. Although there is no specific limitation on the optical layer, one or two or more of appropriate optical layer(s) applicable for formation of a liquid crystal display, etc. can be used. Examples of an optical layer include, for example, a reflector, a transreflector, a retardation plate (such as a λ plate like a half wavelength plate and a quarter wavelength plate), a viewing angle compensating film, a brightness enhanced film, and the like. Examples of a polarizing plate include a reflective polarizing plate or a semitransparent polarizing plate formed by laminating a reflector or a transreflector on the above-mentioned polarizing plate including a polarizer and a protective layer according to the present invention; an elliptical polarizing plate or a circular polarizing plate formed by laminating a retardation plate on the above-mentioned polarizing plate including a polarizer and a protective layer; a polarizing plate formed by laminating a viewing angle compensating film on the above-mentioned polarizing plate including a polarizer and a protective layer; and a polarizing plate formed by laminating a brightness enhanced film on the above-mentioned polarizing plate including a polarizer and a protective layer.

A reflector may be provided on a polarizing plate to form a reflective polarizing plate. In general, such a reflective polarizing plate is provided on the backside of a liquid crystal cell in order to make a liquid crystal display, etc. to display by reflecting incident light from a visible side (display side). The reflective polarizing plate has some advantages, for example, light sources such as backlight need not be built in, and thus the liquid crystal display can be thinner.

The reflective polarizing plate can be formed in an appropriate manner such as by attaching a reflecting layer made of, for example, metal on one surface of the polarizing plate via, for example, the above-mentioned transparent protective film as required. As a specific example, a reflecting layer may be formed by attaching a foil of a reflective metal such as aluminum or a deposition film on one surface of the transparent protective film that has been subjected to matting treatment as required.

Another example of a reflective polarizing plate includes the above-mentioned transparent protective film having a surface of microscopic asperities due to fine particles contained and a reflecting layer corresponding to the microscopic asperities. The reflecting layer having a surface with microscopic asperities diffuses incident light irregularly, so that directivity and glare can be prevented and irregularity in color tones can be controlled. This transparent protective film can be formed by attaching a metal directly onto a surface of a transparent protective film using any appropriate methods including deposition, such as vacuum deposition, and plating, such as ion plating and sputtering.

Furthermore, the reflector can be used as, for example, a reflecting sheet formed by providing a reflecting layer onto an appropriate film similar to the transparent protective film, instead of the above-mentioned method of producing a reflector directly on the transparent protective film of the polarizing plate. The reflecting layer of the reflector, which generally is made of metal, may be preferably used with its surface covered with a film, a polarizing plate or the like, because the reduction of reflectance due to oxidation can be prevented, the initial reflectance can be maintained for a long time, an additional protective layer need not be formed, or the like.

A semitransparent polarizing plate can be obtained by using the method for forming the reflective polarizing plate described above, except that a semitransparent reflecting layer such as a half mirror, which reflects light and transmits light, is used instead of the reflecting layer. In general, the semitransparent polarizing plate may be provided on the backside of a liquid crystal cell. When a liquid crystal display is used in a relatively bright atmosphere, the semitransparent polarizing plate allows an incident light from the visible side (display side) to be reflected to display an image, while in a relatively dark atmosphere, an image is displayed by using a built-in light source such as a backlight behind the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

An elliptical polarizing plate or a circular polarizing plate in which a retardation plate is additionally laminated on the above-mentioned polarizing plate including a polarizer and a protective layer will now be explained.

A retardation plate is typically used for modifying linearly polarized light to either elliptical polarized light or circular polarized light, modifying elliptical polarized light or circular polarized light to linearly polarized light, or modifying a polarization direction of linearly polarized light. In particular, a retardation plate called a quarter wavelength plate ($\lambda/4$ plate) is generally used for modifying linearly polarized light to circular polarized light, and for modifying circular polarized light to linearly polarized light. A half wavelength plate ($\lambda/2$ plate) is generally used for modifying a polarization direction of linearly polarized light.

An elliptical polarizing plate can be effective in compensating (preventing) colors (blue or yellow) generated due to birefringence in a liquid crystal layer of a super twist nematic (STN) liquid crystal display so as to provide a black-and-white display free from the above-mentioned colors. Controlling three-dimensional refractive index may be further preferred since an elliptical polarizing plate can compensate (prevent) colors observed when looking a screen of the liquid crystal display from an oblique direction. A circular polarizing plate is effective, for example, in adjusting color tones of an image of a reflective liquid crystal display that has a color image display, and it also serves to prevent reflection as well.

Examples of the retardation plate include, for example, a birefringent film prepared by stretching an appropriate polymer film, an oriented film of a liquid crystal polymer, and an oriented layer of a liquid crystal polymer that is supported by a film, and the like. Examples of the polymer include, polycarbonate, polyvinyl alcohol, polystyrene, polymethyl methacrylate, polyolefins such as polypropylene, polyalylate, and polyamide. The incline-oriented film may be prepared by, for example, bonding a heat shrinkable film to a polymer film and subjecting the polymer film to stretching treatment and/or shrinking treatment under the influence of a shrinkage force by heat, or by orienting obliquely a liquid crystal polymer.

A polarizing plate in which a viewing angle compensating film is additionally laminated on the above-mentioned polarizing plate including a polarizer and a protective layer will now be explained.

The viewing angle compensating film is typically used for widening a viewing angle so that an image can be seen relatively clearly even when a screen of a liquid crystal display is viewed from a slightly oblique direction.

As the viewing angle compensating film, a triacetylcellulose film etc. coated with a discotic liquid crystal, or a retardation plate can be used. While an ordinary retardation plate is a birefringent polymer film that is stretched uniaxially in the face direction, a retardation plate used as the viewing angle compensating film is a two-way stretched film such as a birefringent polymer film stretched biaxially in the face direction, or an incline-oriented polymer film with a controlled refractive index in the thickness direction that is stretched uniaxially in the face direction and stretched also in the thickness direction. The incline-oriented film is prepared by, for example, bonding a heat shrinkable film to a polymer film and subjecting the polymer film to stretching treatment and/or shrinking treatment under the influence of a shrinkage force by heat, or by obliquely orienting a liquid crystal polymer. A polymer as a material of the retardation plate is similar to the polymer used for the above-mentioned retardation plate.

A polarizing plate in which a brightness enhanced film is attached to the above-mentioned polarizing plate including a polarizer and a protective layer is generally arranged on the backside of a liquid crystal cell. When natural light enters by the backlight of the liquid crystal display etc. and reflection from the backside and the like, the brightness enhanced film reflects linearly polarized light of a predetermined polarizing axis or circularly polarized light in a predetermined direction, while transmitting other light. The polarizing plate in which the brightness enhanced film is laminated on the above-mentioned polarizing plate including a polarizer and a protective layer allows entrance of light from a light source such as a backlight to obtain transmitted light in a predetermined polarization state, while reflecting light other than light in the predetermined polarization state. Light reflecting by the brightness enhanced film is reversed through a reflecting layer or the like arranged additionally behind the brightness enhanced film. The reversed light is allowed to re-enter the brightness enhanced plate. The re-entering light is transmitted partly or entirely as light in a predetermined polarization state so as to increase the amount of light passing through the brightness enhanced film and polarized light that is hardly absorbed in the polarizer is supplied so as to increase the amount of light available for the liquid crystal display, etc. Thus, the brightness can be improved. When light enters through a polarizer from the backside of the liquid crystal cell by using a backlight or the like without using any brightness enhanced films, most of the light having a polarization direction inconsistent with the polarization axis of the polarizer is absorbed in the polarizer but not transmitted by the polarizer. Depending on the characteristics of the polarizer, about 50% of light is absorbed in the polarizer, which decreases the quantity of light available in the liquid crystal display or the like and makes the image dark. The brightness enhanced film repeatedly prevents light having a polarization direction to be absorbed in the polarizer from entering the polarizer to reflect the light on the brightness enhanced film, and reverses the light through a reflecting layer or the like provided behind the brightness enhanced film to make the light re-enter the brightness enhanced plate. Since the brightness enhanced film transmits the polarized light that is reflected and reversed between the brightness enhanced film and the reflecting layer only if the polarized light has a polarization direction to pass the polarizer, light from a backlight or the like can be used efficiently for displaying images of a liquid crystal display to provide a bright screen.

Examples of the brightness enhanced film include, for example, a film which transmits a linearly polarized light having a predetermined polarization axis and reflects other light, for example, a multilayer thin film of a dielectric or a multilayer laminate of thin films with varied refraction aeolotropy; a film that reflects either clockwise or counterclockwise circular polarized light while transmitting other light, for example, a cholesteric liquid crystal layer, more specifically, an oriented film of a cholesteric liquid crystal polymer or an oriented liquid crystal layer supported on a supportive substrate, or the like.

Therefore, with the brightness enhanced film transmitting a linearly polarized light having a predetermined polarization axis, the transmitted light directly enters the polarizing plate with the polarization axes matched, so that absorption loss due to the polarizing plate is controlled and the light can be transmitted efficiently. On the other hand, with the brightness enhanced film transmitting a circular polarized light, such as a cholesteric liquid crystal layer, preferably, the transmission circular polarized light is converted into linearly polarized light before entering the polarizing plate in an aspect of controlling of the absorption loss, although the circular polarized light can enter the polarizer directly. Circular polarized light can be converted into linearly polarized light by using a quarter wavelength plate as a retardation plate.

A retardation plate having a function as a quarter wavelength plate in a wide wavelength range of a visible light region can be obtained, for example, by overlapping a retardation layer functioning as a quarter wavelength plate for monochromatic light such as light having 550 nm wavelength, and another retardation plate showing a separate optical retardation property, for example, a retardation plate functioning as a half wavelength plate. Therefore, a retardation plate arranged between a polarizing plate and a brightness enhanced film can include a single layer or at least two layers of retardation layers.

A cholesteric liquid crystal layer also can be provided by combining layers different in the reflection wavelength and it can be configured by overlapping two or at least three layers. As a result, the obtained retardation plate can reflect circular polarized light in a wide wavelength region of a visible light region, thus providing transmission circular polarized light in a wide wavelength region.

Furthermore, a polarizing plate can be formed by laminating a polarizing plate and two or at least three optical layers like the above-mentioned polarization separating type polarizing plate. Therefore, the polarizing plate can be a reflective elliptical polarizing plate, a semitransparent elliptical polarizing plate or the like, which is prepared by combining the above-mentioned reflective polarizing plate or a semitransparent polarizing plate with a retardation plate. An optical member including a lamination of two or at least three optical layers can be formed in a method of laminating layers separately in a certain order for manufacturing a liquid crystal display etc. or in a method for preliminary lamination. Because an optical member that has been laminated previously has excellent stability in quality and assembling operability, efficiency in manufacturing a liquid crystal display can be improved. Any appropriate adhesion means, such as a pressure sensitive adhesive layer, can be used for lamination.

The pressure sensitive adhesive layer can be provided on a polarizing plate or on an optical member for adhesion with other members such as a liquid crystal cell. The adhesive layer can be formed by the conventional appropriate pressure sensitive adhesives, such as an acrylic pressure sensitive adhesive. Pressure sensitive adhesives having a low moisture absorption coefficient and an excellent heat resistance may be preferred due to aspects of prevention of foaming or peeling caused by moisture absorption, prevention of decrease in the optical properties and warping of a liquid crystal cell caused by difference in thermal expansion coefficients, formation of a high quality liquid crystal display having excellent durability, etc. The pressure sensitive adhesive layer can contain fine particles to obtain optical diffusivity. Pressure sensitive adhesive layers can be provided on necessary surfaces if required. For example, the polarizing plate including a polarizer and a protective layer can be provided with a pressure sensitive adhesive layer on at least one surface of the protective layer as required.

When a pressure sensitive adhesive layer provided on the polarizing plate or the optical member is exposed on the surface, preferably, the pressure sensitive adhesive layer is temporarily covered with a separator for preventing contamination by the time the pressure sensitive adhesive layer is used. The separator can be made of an appropriate thin sheet by coating a peeling agent if required. Examples of a peeling agent include, for example, a silicone-based peeling agent, a long-chain alkyl-based peeling agent, a fluorine-based peeling agent, a peeling agent including molybdenum sulfide or the like.

The above-described members forming a polarizing plate and an optical member, such as a polarizing film, a transparent protective film, an optical layer, and a pressure sensitive adhesive layer can have ultraviolet absorption power by treating with an ultraviolet absorber such as, for example, an ester salicylate compound, a benzophenone compound, a benzotriazole compound, a cyanoacrylate compound, a nickel complex salt compound, or the like.

The above-mentioned polarizing plate can be used for formation of various apparatus such as a liquid crystal display. The liquid crystal display can be produced as conventionally known structures, such as transmission type, reflection type, or a transmission-reflection type. A liquid crystal cell forming the liquid crystal display can be selected arbitrarily from appropriate cells such as active matrix driving type represented by a thin film transistor, a simple matrix driving type represented by a twist nematic type and a super twist nematic type.

When polarizing plates or optical members are provided on both sides of a liquid crystal cell, the polarizing plates or the optical members on both sides can be the same or different. Moreover, for forming a liquid crystal display, one or at least two layers of appropriate members such as a prism array sheet, a lens array sheet, an optical diffuser, or a backlight can be arranged at appropriate positions.

Hereinafter, the present invention will be explained with reference to Examples and Comparative Examples.

EXAMPLE 1

A non-stretched PVA film having a polymerization degree of 2400, a thickness in a non-stretched state of 75 μm and a width in a non-stretched state of 800 mm was prepared as a synthetic film. The PVA film was stretched to three times an original length in a first bath (a bath 1) including water as a main component; then stretched to 1.1 times an original length in a dyeing bath including an aqueous solution dissolving iodine and potassium iodide; thereafter immersed in a crosslinking bath containing boric acid and potassium iodide, and stretched to 1.8 times an original length in a washing bath including water. Thereafter, the film was dried and was rolled up as a polarizer.

Next, a TAC film was prepared as a protective film. In the following explanation, one side of this TAC film is referred to as a side 1 and another side of this TAC film is referred to as a side 2. The FTIR-ATR method was carried out with respect to the both sides of the protective film. A peak intensity (A) in the wavelength range around 1488 $cm^{-1}$ of the side 1, a peak intensity (B) in the wavelength range around 1365 $cm^{-1}$ of the side 1, a peak intensity (A') in the wavelength range around 1488 $cm^{-1}$ of the side 2 and a peak intensity (B') in the wavelength range around 1365 $cm^{-1}$ of the side 2 were measured; and (A)/(B)=(C), (A')/(B')=(C') and (C)/(C') were calculated, respectively. Table 1 shows the results.

Then, the polarizer was attached to the TAC film so that the side 1 of the TAC film was brought into contact with both sides of the polarizer. This polarizing plate was cut out into a size of 12.1 inches at the absorption axis of 45° or 135°. The initial curling (warping) amount right after it was cut out and the curling (warping) amount of the polarizing plate after left at a temperature of 23° C. and humidity of 60% for one hour were measured respectively. Table 1 shows the results.

The measurement of the curling (warping) amount was carried out by measuring the distance from the horizontal level in the portion where the curling (warping) is at the maximum when the curled polarizing plate was put on the horizontal level in a form of concave shape.

EXAMPLE 2

A polarizing plate was prepared by the same method as in Example 1 except that a different TAC film was used. The same measurement results as in Example 1 are shown in Table 1.

EXAMPLE 3

Furthermore, a polarizing plate was prepared by the same method as in Example 1 except that a different TAC film was used. The same measurement results as in Example 1 are shown in Table 1.

COMPARATIVE EXAMPLE 1

A polarizing plate was prepared by the same method as in Example 1 except that the polarizer and the TAC film were attached to each other so that the side 1 of the TAC film was brought into contact with one side of the polarizer and the side 2 of the TAC film was brought into contact with another side of the polarizer. The same measurement results as in Example 1 are shown in Table 1.

COMPARATIVE EXAMPLE 2

A polarizing plate was prepared by the same method as in Comparative Example 1 except that the same TAC film as in Example 2 was used. The same measurement results as in Example 1 are shown in Table 1.

COMPARATIVE EXAMPLE 3

A polarizing plate was prepared by the same method as in Comparative Example 1 except that the same TAC film as in Example 3 was used. The same measurement results as in Example 1 are shown in Table 1.

TABLE 1

|  |  | (A) (A') | (B) (B') | (C) (C') | (C)/(C') | curling *1 | curling *2 |
|---|---|---|---|---|---|---|---|
| Ex. 1 | side 1 | 0.234 | 0.640 | 0.366 | 1.22 | 15 mm | 15 mm |
|  | side 2 | 0.132 | 0.442 | 0.299 |  | or less | or less |
| Ex. 2 | side 1 | 0.195 | 0.564 | 0.346 | 1.37 | 15 mm | 15 mm |
|  | side 2 | 0.155 | 0.616 | 0.252 |  | or less | or less |
| Ex. 3 | side 1 | 0.244 | 0.616 | 0.396 | 1.48 | 15 mm | 15 mm |
|  | side 2 | 0.170 | 0.637 | 0.267 |  | or less | or less |
| Co. 1 | side 1 | 0.234 | 0.640 | 0.366 | 1.22 | 25–50 mm | 25–80 mm |
|  | side 2 | 0.132 | 0.442 | 0.299 |  |  |  |
| Co. 2 | side 1 | 0.195 | 0.564 | 0.346 | 1.37 | 25–50 mm | 25–80 mm |
|  | side 2 | 0.155 | 0.616 | 0.252 |  |  |  |
| Co. 3 | side 1 | 0.244 | 0.616 | 0.396 | 1.48 | 25–50 mm | 25–80 mm |
|  | side 2 | 0.170 | 0.637 | 0.267 |  |  |  |

Ex. = Example
Co. = Comparative Example
curling *1 = amount of initial curling
curling *2 = amount of curling after subjected to a heating and humid condition As is apparent from Table 1, in the polarizing plate of Examples 1, 2 and 3, the initial curling amount and the curling amount after it was subjected to a heating and humid condition were less than 15 mm. On the other hand, in the polarizing plate of the Comparative Examples 1, 2 and 3, the initial curling amount was 25 to 50 mm and the curling amount after subjected to a heating and humid condition were 25 to 80 mm. Thus, the curling (warping) occurred significantly.

As mentioned above, according to the present invention, when the amount of plasticizer in the vicinity of the surface of the protective film is different between one side and another side, by attaching the protective film to the polarizer so that one side to protective film is attached to one side of the polarizer and another side of the protective film is attached to another side of the polarizer, the shrinking power of the protective film is allowed to be balanced, thereby preventing the polarizing plate from curling (warping). Thus, a polarizing plate according to the present invention may provide an excellent industrial value.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description, and all changes which come within the meaning and range of equivalency of the claims are intended to be embraced therein.

What is claimed is:

1. A polarizing plate comprising
a polarizer made of a synthetic resin and protective films, the same protective films being attached to both sides of the polarizer, wherein:
when a FTIR-ATR method is carried out with respect to the both sides of the protective film and a peak intensity (A) in the wavelength range around 1488 $cm^{-1}$ of one side, a peak intensity (B) in the wavelength range around 1365 $cm^{-1}$ of one side, a peak intensity (A') in the wavelength range around 1488 $cm^{-1}$ of another side and a peak intensity (B') in the wavelength range around 1365 $cm^{-1}$ of another side are measured, and (C) and (C') are represented by the relationships: (A)/(B)=(C) and (A')/(B')=(C'), (C)/(C')≧1.2 is satisfied, and the same sides of the protective films having the (C) and (C') are adhered to both sides of the polarizer.

2. The polarizing plate according to claim 1, wherein the synthetic resin film comprises a polyvinyl alcohol film and the protective film comprises a triacetylcellulose film.

3. The polarizing plate according to claim 1, further comprising a pressure sensitive adhesive layer.

4. The polarizing plate according to claim 1, further comprising an anti-glare layer.

5. The polarizing plate according to claim 1, further comprising at least one selected from the group consisting of a reflector and a transreflector attached to the polarizing plate.

6. The polarizing plate according to claim 1, further comprising at least one selected from the group consisting of a retardation plate and a λ plate attached to the polarizing plate.

7. The polarizing plate according to claim 1, further comprising a viewing angle compensating film attached to the polarizing plate.

8. The polarizing plate according to claim 1, further comprising a brightness enhancement film attached to the polarizing plate.

9. A liquid crystal display comprising: a liquid crystal cell; a polarizing plate on at least one side of the liquid crystal cell, the polarizing plate comprising a polarizer made of a synthetic resin and protective films, the same protective films being attached to both sides of the polarizer; wherein when a FTIR-ATR method is carried out with respect to the both sides of the protective film and a peak intensity (A) in the wavelength range around 1488 $cm^{-1}$ of one side, a peak intensity (B) in the wavelength range around 1365 $cm^{-1}$ of one side, a peak intensity (A') in the wavelength range around 1488 $cm^{-1}$ of another side and a peak intensity (B') in the wavelength range around 1365 $cm^{-1}$ of another side are measured, and (C) and (C') are represented by the relationships: (A)/(B)=(C) and (A')/(B')=(C'), (C)/(C')$\geq$1.2 is satisfied; and the same sides of the protective films having the (C) and (C') are adhered to both sides of the polarizer.

10. The liquid crystal display according to claim 9, wherein the synthetic resin film comprises a polyvinyl alcohol film and the protective film comprises a triacetylcellulose film.

11. The liquid crystal display according to claim 9, further comprising a pressure sensitive adhesive layer.

12. The liquid crystal display according to claim 9, further comprising an anti-glare layer.

13. The liquid crystal display according to claim 9, further comprising at least one selected from the group consisting of a reflector and a transreflector attached to the polarizing plate.

14. The liquid crystal display according to claim 9, further comprising at least one selected from the group consisting of a retardation plate and a λ plate attached to the polarizing plate.

15. The liquid crystal display according to claim 9, further comprising a viewing angle compensating film attached to the polarizing plate.

16. The liquid crystal display according to claim 9, further comprising a brightness enhancement film attached to the polarizing plate.

17. A method of making a polarizing plate comprising attaching protective films to both sides of a polarizer, wherein, when a FTIR-ATR method is carried out with respect to the both sides of the protective film and a peak intensity (A) in the wavelength range around 1488 cm–1 of one side, a peak intensity (B) in the wavelength range around 1365 cm–1 of one side, a peak intensity (A') in the wavelength range around 1488 cm–1 of another side and a peak intensity (B') in the wavelength range around 1365 cm–1 of another side are measured, and (C) and (C') are represented by the relationships: (A)/(B)=(C) and (A')/(B')=(C'), (C)/(C')$\geq$1.2 is satisfied, and the same sides of the protective films having the (C) and (C') are adhered to both sides of the polarizer.

18. A method of making a liquid crystal display comprising attaching protective films to both sides of a polarizer to form a polarizing plate, wherein, when a FTIR-ATR method is carried out with respect to the both sides of the protective film and a peak intensity (A) in the wavelength range around 1488 cm–1 of one side, a peak intensity (B) in the wavelength range around 1365 cm–1 of one side, a peak intensity (A') in the wavelength range around 1488 cm–1 of another side and a peak intensity (B') in the wavelength range around 1365 cm–1 of another side are measured, and (C) and (C') are represented by the relationships: (A)/(B)=(C) and (A')/(B')=(C'), (C)/(C')$\geq$1.2 is satisfied, and the same sides of the protective films having the (C) and (C') are adhered to both sides of the polarizer, and disposing the polarizing plate on at least one side of a liquid crystal cell.

* * * * *